United States Patent
Hu et al.

(10) Patent No.: US 11,187,965 B2
(45) Date of Patent: Nov. 30, 2021

(54) OPTICAL ELEMENT DRIVING MECHANISM WITH STOPPING ASSEMBLY

(71) Applicant: TDK TAIWAN CORP., Taoyuan (TW)

(72) Inventors: Chao-Chang Hu, Taoyuan (TW);
Chao-Hsi Wang, Taoyuan (TW);
Chih-Wei Weng, Taoyuan (TW);
He-Ling Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/898,763

(22) Filed: Jun. 11, 2020

(65) Prior Publication Data
US 2021/0026224 A1   Jan. 28, 2021

Related U.S. Application Data

(60) Provisional application No. 62/879,190, filed on Jul. 26, 2019.

(30) Foreign Application Priority Data

Feb. 3, 2020  (CN) .......................... 202020150609.8

(51) Int. Cl.
*G03B 13/36*   (2021.01)
*H04N 5/225*   (2006.01)
(Continued)

(52) U.S. Cl.
CPC .............. *G03B 13/36* (2013.01); *G01P 15/02* (2013.01); *G02B 7/04* (2013.01); *G02B 7/08* (2013.01); *G02B 7/09* (2013.01); *G02B 27/646* (2013.01); *G03B 5/00* (2013.01); *G03B 5/02* (2013.01); *H02K 33/18* (2013.01); *H02K 41/0354* (2013.01); *H02K 41/0356* (2013.01); *H04N 5/2251* (2013.01); *H04N 5/2252* (2013.01);
(Continued)

(58) Field of Classification Search
CPC .. G03B 13/36; G03B 5/02; G03B 2205/0076; G03B 2205/0007; G03B 2205/0069; G03B 5/00; G01P 15/02; H02K 41/0356; H02K 41/035; H02K 33/18; H02K 41/0354; G02B 7/09; G02B 7/08; G02B 7/04; G02B 27/646; H04N 5/2254; H04N 5/2257; H04N 5/2253; H04N 5/2251; H04N 5/2252
See application file for complete search history.

(56) References Cited

U.S. PATENT DOCUMENTS 7,880,982 B2 * 2/2011 Otsuki .................... G03B 3/10
359/819
8,970,973 B2 * 3/2015 Cho ........................ G02B 7/08
359/823

(Continued)

*Primary Examiner* — Padma Haliyur
(74) *Attorney, Agent, or Firm* — Muncy, Geissler, Olds and Lowe, P.C.

(57) ABSTRACT

An optical element driving mechanism is provided, including a fixed part, a movable part, a driving assembly, and a stopping assembly. The movable part is movably disposed on the fixed part, and the movable part is connected to a first optical element. The driving assembly is at least partially disposed on the fixed part. The stopping assembly is disposed between the movable part and the fixed part. The stopping assembly limits the range of motion of the movable part relative to the fixed part.

18 Claims, 18 Drawing Sheets

(51) Int. Cl.
    *G02B 7/09*           (2021.01)
    *G02B 7/04*           (2021.01)
    *G02B 27/64*         (2006.01)
    *G03B 5/00*           (2021.01)
    *H02K 41/035*       (2006.01)
    *G02B 7/08*           (2021.01)
    *G01P 15/02*        (2013.01)
    *G03B 5/02*           (2021.01)
    *H02K 33/18*        (2006.01)

(52) U.S. Cl.
    CPC ......... *H04N 5/2253* (2013.01); *H04N 5/2254* (2013.01); *H04N 5/2257* (2013.01); *G03B 2205/0007* (2013.01); *G03B 2205/0069* (2013.01); *G03B 2205/0076* (2013.01)

(56) References Cited

U.S. PATENT DOCUMENTS

| | | | |
|---|---|---|---|
| 2011/0096178 A1* | 4/2011 | Ryu | H04N 5/2252 348/208.2 |
| 2015/0309282 A1* | 10/2015 | Lee | G03B 3/10 359/814 |
| 2018/0136482 A1* | 5/2018 | Kuo | G02B 27/646 |

\* cited by examiner

OPTICAL ELEMENT DRIVING MECHANISM WITH STOPPING ASSEMBLY

CROSS-REFERENCE TO RELATED APPLICATIONS

The present application claims priority to U.S. Provisional Patent Application No. 62/879,190, filed on Jul. 26, 2019 and China Patent Application No. 202020150609.8, filed on Feb. 3, 2020, which are incorporated by reference herein in their entirety.

BACKGROUND OF THE DISCLOSURE

Field of the Disclosure

The present disclosure relates to an optical element driving mechanism and an optical device, and more particularly to an optical element driving mechanism and an optical device of an electrical device.

Description of the Related Art

As the relevant technologies have developed, many electronic devices (such as computers or tablets) can record images and videos. However, when a lens having a long focal length is provided in an electronic device, the thickness thereof may be increased, impeding the prospects for miniaturization of the electronic device. Therefore, the development of an optical element driving mechanism and an optical device capable of minimizing the electrical device is an important issue.

BRIEF SUMMARY OF THE DISCLOSURE

To solve the problems of the prior art, an optical element driving mechanism is provided, including a fixed part, a movable part, a driving assembly and a stopping assembly. The movable part is movably disposed on the fixed part, and the movable part is connected to a first optical element. The driving assembly is at least partially disposed on the fixed part. The stopping assembly is disposed between the movable part and the fixed part. The stopping assembly limits the range of motion of the movable part relative to the fixed part.

In one of the embodiments of the present disclosure, the driving assembly includes a driving coil, the driving coil is wound in a first direction, and the driving coil has a polygonal structure when observed in the first direction. The driving assembly drives the movable part to move in the first direction. The driving assembly further includes a magnetic conductive element connected to the fixed part, and the largest size of the driving coil is smaller than the largest size of the magnetic conductive element when observed in the first direction. The driving assembly further includes a plurality of magnetic elements, and the like magnetic poles of the magnetic elements face the driving coil.

In one of the embodiments of the present disclosure, the fixed part includes a magnetic element accommodation and a base plate, the magnetic element accommodation accommodates the magnetic elements, and the magnetic element accommodation extends in the first direction, and the base plate is adjacent to the magnetic element accommodation. The base plate includes a base plate opening corresponding to the driving coil. The magnetic element accommodation has a first side, when the driving coil does not receive an external current, the magnetic element is located on the first side. The movable part includes an elastic element, and the magnetic element accommodation further includes a second side opposite the first side, the elastic element is connected to the magnetic element and the first side or the second side.

In one of the embodiments of the present disclosure, the driving assembly further includes a magnetic element, the driving coil has a long side, and the magnetic element is disposed corresponding to the long side. The optical element driving mechanism further includes an optical axis. The long side of the driving coil is parallel to the optical axis. The movable part further includes a holder, the holder has a holder protrusion, the minimum distance between the holder protrusion and the fixed part is smaller than the minimum distance between the magnetic element and the driving coil. The fixed part has an outer frame sidewall facing the driving coil, and the fixed part further includes a magnetic conductive element accommodation disposed on the outer frame sidewall. The magnetic conductive element accommodation has an indented structure.

In one of the embodiments of the present disclosure, the optical element driving mechanism further includes a first magnetic element and a second magnetic element, and the opposite magnetic poles of the first magnetic element and the second magnetic element face the driving coil. The fixed part includes a magnetic element accommodation, the magnetic element accommodation has a first side and a second side opposite each other, when the driving coil does not receive an external current, the first magnetic element is adjacent to the first side, and the second magnetic element is adjacent to the second side, and the shortest distance between the first magnetic element and the first side is smaller than the shortest distance between the second magnetic element and the first side. The movable part includes a first movable unit, a second movable unit, a first elastic element and a second elastic element. The first elastic element is disposed between the first movable unit and the second side. The second elastic element is disposed between the second movable unit and the first side. The first movable unit is connected to the first optical element, the second movable unit is connected to a second optical element, and the first movable unit may move relative to the second movable unit.

To solve the problems of the prior art, an optical device is provided, including an optical element driving mechanism, a camera module. The camera module includes a photosensitive element and an optical unit. The optical unit is located between the optical element driving mechanism and the photosensitive element. The fixed part corresponds to the camera module.

In one of the embodiments of the present disclosure, the driving assembly at least partially overlaps the photosensitive element when observed in the first direction.

BRIEF DESCRIPTION OF THE DRAWINGS

The preferred embodiments are exemplified below and described in detail with the accompanying drawings, so as to make the aforementioned and other purposes, features, and advantages of this disclosure more comprehensible, wherein.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
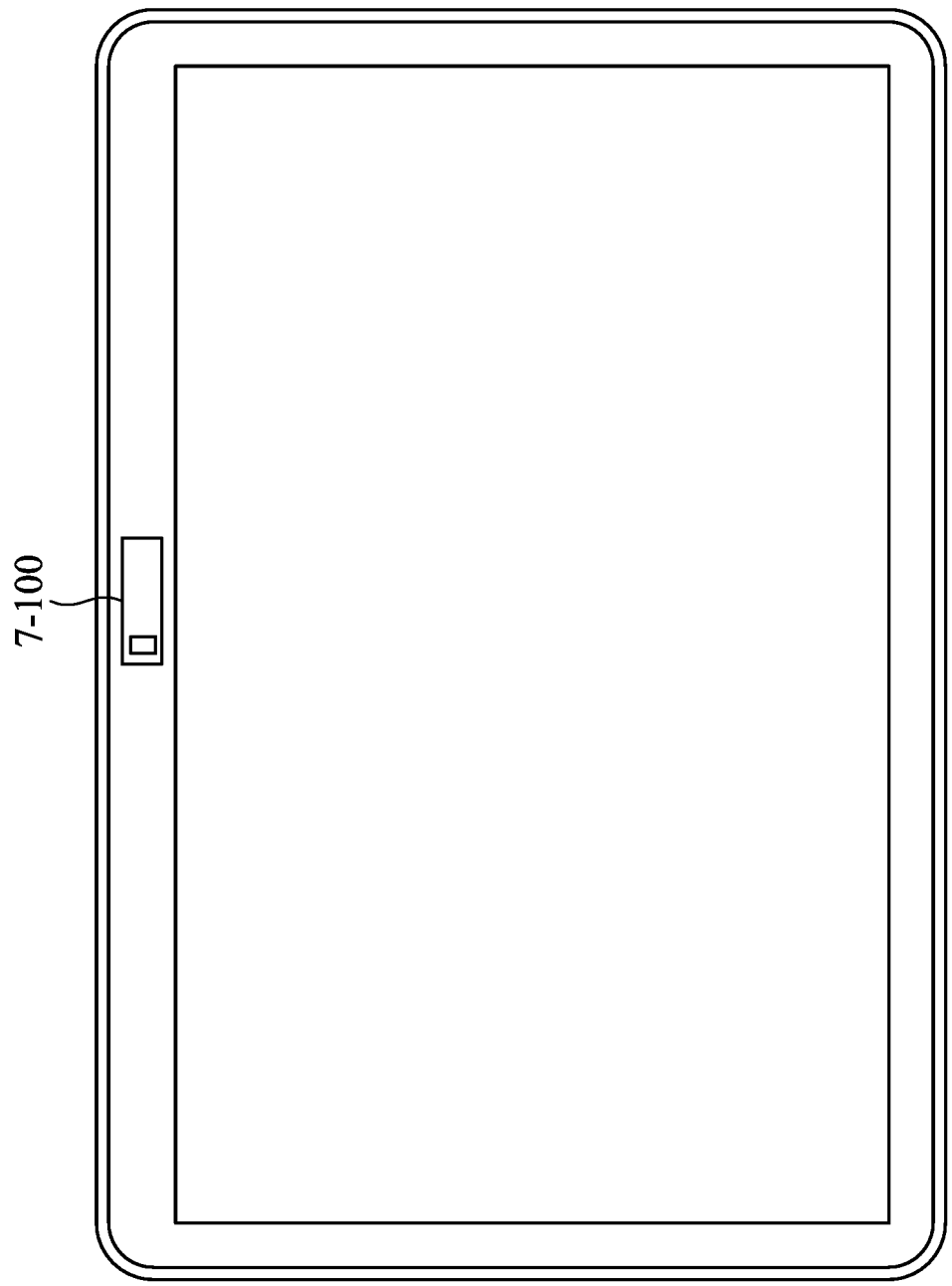
FIG. 1 shows a schematic view of an electrical device with an optical element driving mechanism according to an embodiment of the present disclosure.

Firstly, please refer to FIG. 1, an optical element driving mechanism 7-100 of an embodiment of the present disclosure may be mounted in an electrical device 7-1 for taking photos or videos, wherein the aforementioned electrical device 7-1 may, for example, be a smartphone, a tablet or a computer, but the present disclosure is not limited to these. It should be noted that the position and the size between the optical element driving mechanism 7-100 and the electrical device 7-1 shown in FIG. 1 are only an example, which is not for limiting the position and the size between the optical element driving mechanism 7-100 and the electrical device 7-1. In fact, according to different needs, the optical element driving mechanism 7-100 may be mounted at different positions in the electrical device 7-1.

Figure 2:
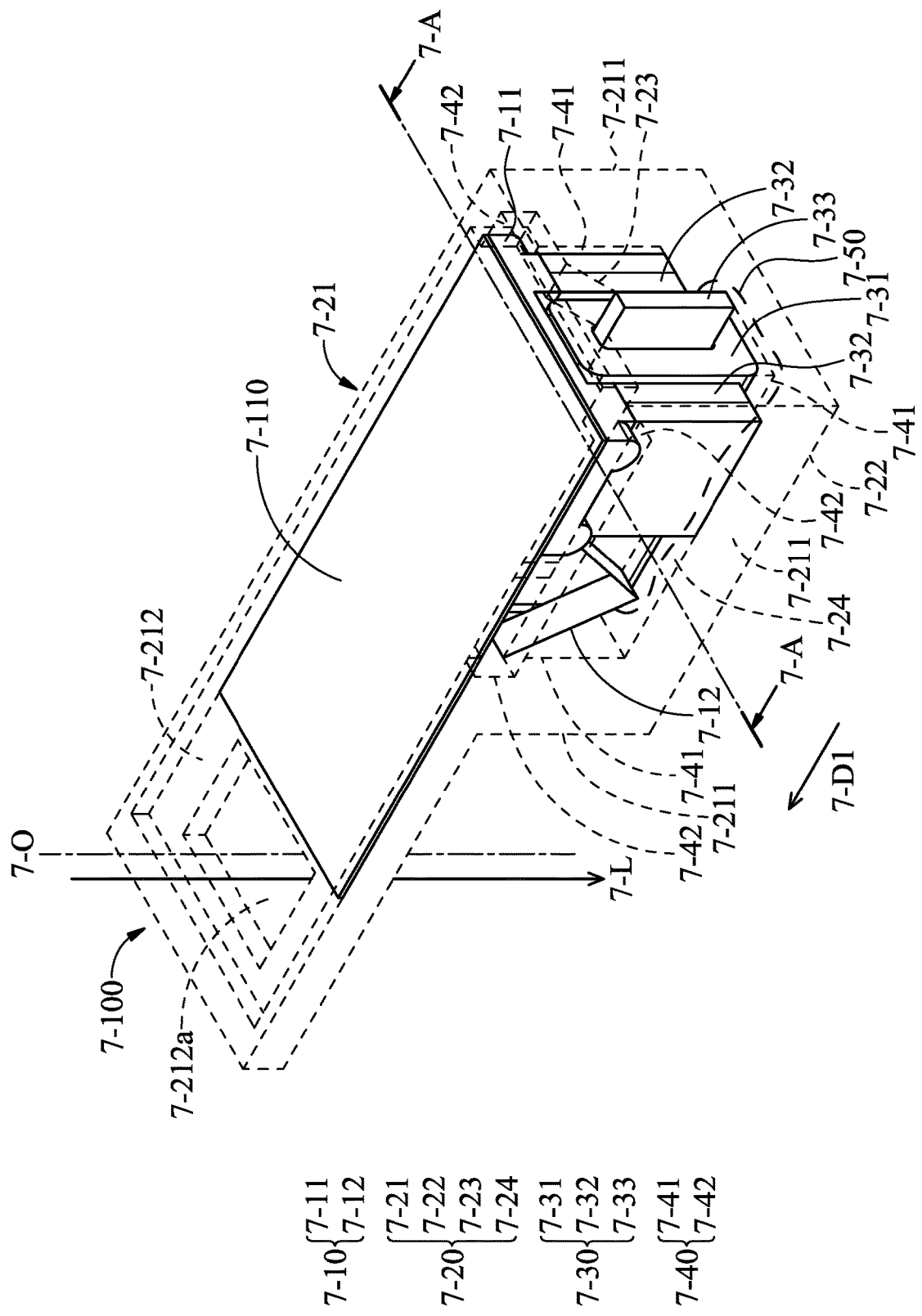
FIG. 2 shows a perspective view of the optical element driving mechanism and a first optical element according to an embodiment of the present disclosure, wherein a fixed part of the optical element driving mechanism is shown as a dashed line.

Please refer to FIG. 2, the optical element driving mechanism 7-100 has an optical axis 7-O, the optical axis 7-O passes through the optical element driving mechanism 7-100. The optical element driving mechanism 7-100 includes a movable part 7-10, a fixed part 7-20, a driving assembly 7-30, a stopping assembly 7-40 and an adhesive element 7-50.

Figure 3:
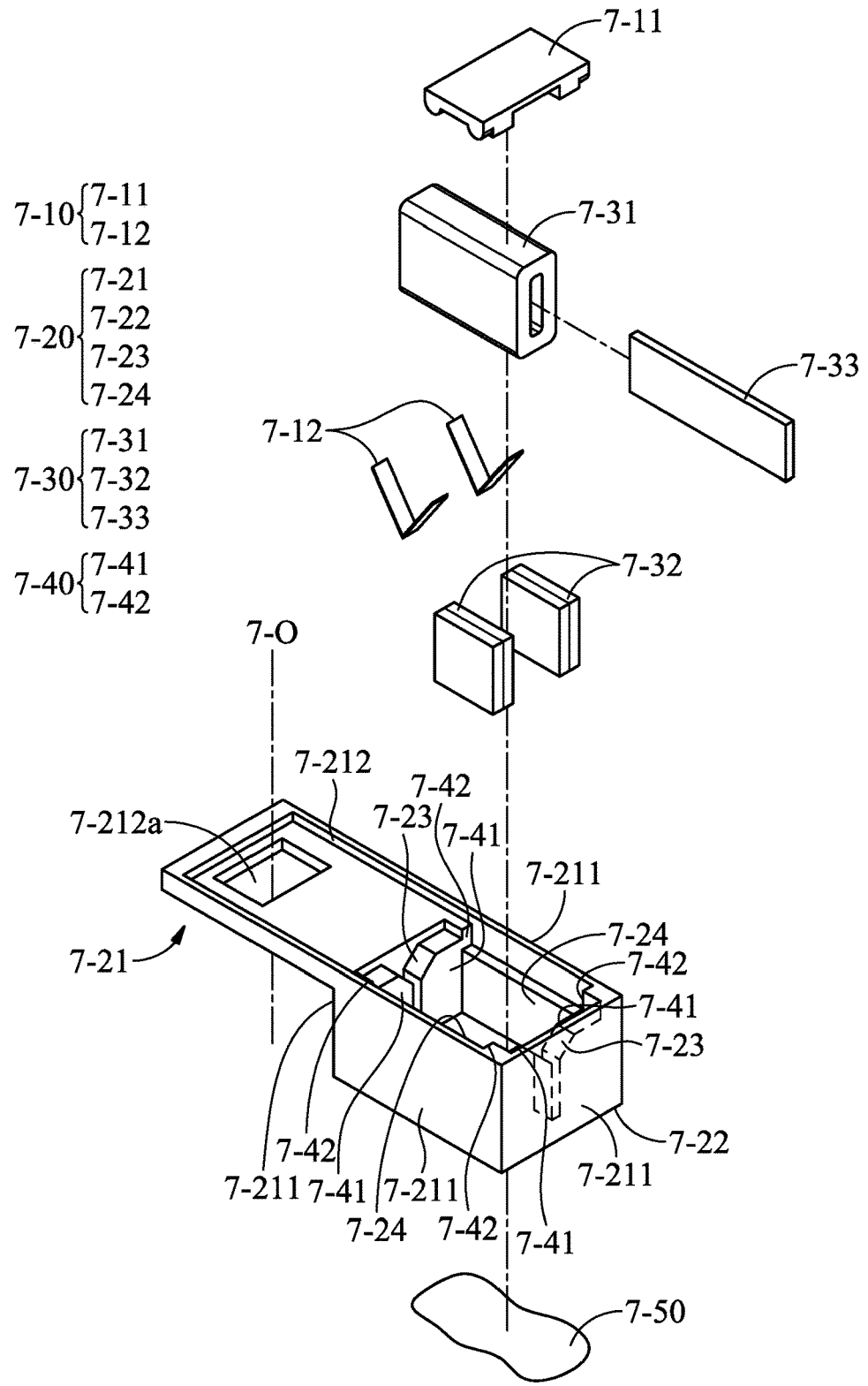
FIG. 3 shows an exploded view of the optical element driving mechanism according to an embodiment of the present disclosure.

Please refer to FIGS. 2 and 3, the movable part 7-10 includes a holder 7-11 and two elastic elements 7-12. The holder 7-11 of the movable part 7-10 is movably disposed on the fixed part 7-20, and the movable part 7-10 connects to a first optical element 7-110. Specifically, the first optical element 7-110 is disposed on the holder 7-11, and the first optical element 7-110 may move as the holder 7-11 moves relative to the fixed part 7-20.

Please refer to FIGS. 2 and 3, the fixed part 7-20 includes an outer frame 7-21, a base plate 7-22, a magnetic conductive element accommodation 7-23 and a magnetic element accommodation 7-24. The outer frame 7-21 of the fixed part 7-20 includes four outer frame sidewalls 7-211 and an outer frame extension part 7-212, and the holder 7-11 is disposed on the outer frame 7-21. The four outer frame sidewalls 7-211 face the driving assembly 7-30, and are parallel to the optical axis 7-O. Each of the outer frame sidewalls 7-211 is connected to the other two outer frame sidewalls 7-211 to form an inner space surrounded by four outer frame sidewalls 7-211. The outer frame extension part 7-212 extends outwardly in a first direction 7-D1 perpendicular to the optical axis 7-O from one of the outer frame sidewalls 7-211. The outer frame extension part 7-212 has an outer frame extension opening 7-212a, and the outer frame extension opening 7-212a may allow a light 7-L to pass through.

Please refer to FIGS. 2 and 3 again, the driving assembly 7-30 includes a driving coil 7-31, two magnetic elements 7-32 and a magnetic conductive element 7-33. The driving coil 7-31, the magnetic element 7-32 and the magnetic conductive element 7-33 of the driving assembly 7-30 may be disposed on the fixed part 7-20, and may be disposed in the inner space. The driving coil 7-31 surrounds (e.g., winds)

the magnetic conductive element 7-33 in the first direction 7-D1, and the outer frame sidewalls 7-211 face the driving coil 7-31. The magnetic elements 7-32 are disposed on the respective sides of the driving coil 7-31.

Please refer to FIGS. 2 and 3 again, the stopping assembly 7-40 includes four magnetic elements stoppers 7-41 and four holder stoppers 7-42. The magnetic element stoppers 7-41 of the stopping assembly 7-40 are disposed between the magnetic elements 7-32 and the outer frame sidewalls 7-211 to limit the range of motion of the magnetic elements 7-32. The holder stoppers 7-42 of the stopping assembly 7-40 are disposed between the holder 7-11 and the outer frame sidewalls 7-211 to limit the range of motion of the holder 7-11 relative to the fixed part 7-20.

Figure 4:
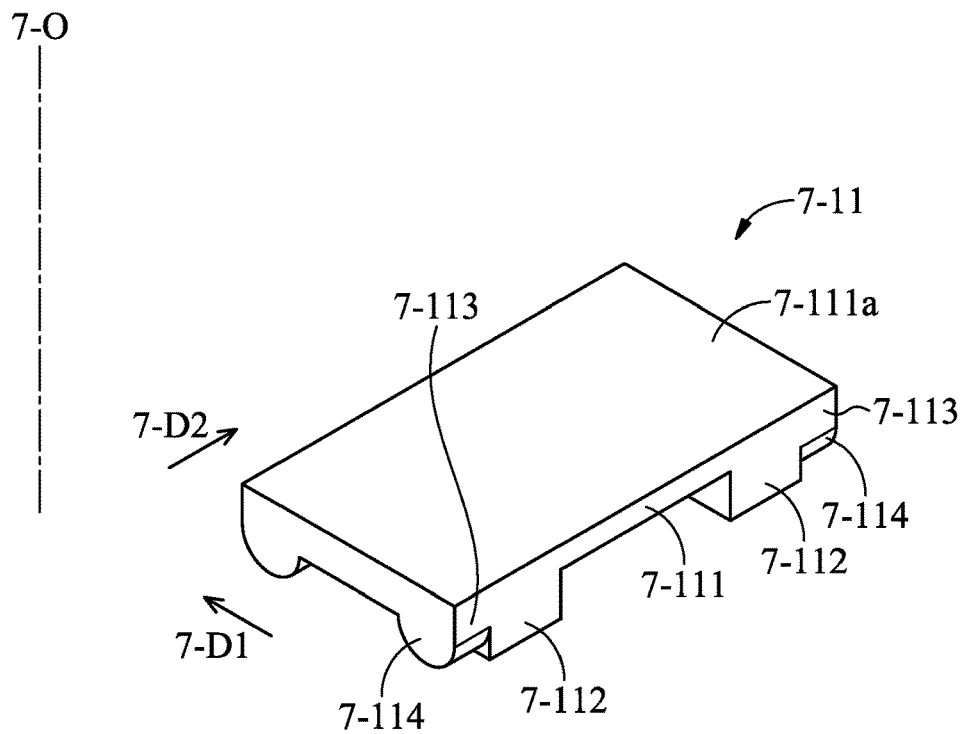
FIG. 4 shows a schematic view of a holder of the optical element driving mechanism according to an embodiment of the present disclosure.

Please refer to FIG. 4, the holder 7-11 of the movable part 7-10 includes a holder body 7-111, two holder connecting parts 7-112, two holder protrusions 7-113 and two holder sliding parts 7-114. The holder body 7-111 has a holder body surface 7-111a. The first optical element 7-110 is disposed on the holder body surface 7-111a, and is fixedly connected to the holder body surface 7-111a (FIG. 2). Therefore, the holder body surface 7-111a may have a flat shape, or any shape that may be effectively connected to the first optical element 7-110. The holder connecting part 7-112 is located on both sides of the holder body 7-111, and the holder connecting part 7-112 extends downwardly from the holder body 7-111, and is respectively connected to the two magnetic elements 7-32 (FIG. 2).

The holder protrusion 7-113 extends outwardly in a second direction 7-D2 perpendicular to the optical axis 7-O and the first direction 7-D1 from both sides of the holder body 7-111. The holder sliding parts 7-114 are located on both sides of the holder 7-11, and may connect to the holder connecting part 7-112. The holder sliding parts 7-114 may be disposed on the outer frame sidewalls 7-211 to move on the outer frame sidewall 7-211. It should be noted that the holder sliding part 7-114 may have a wheel shape, or any shape that is helpful to the movement of the holder 7-11.

Figure 5:
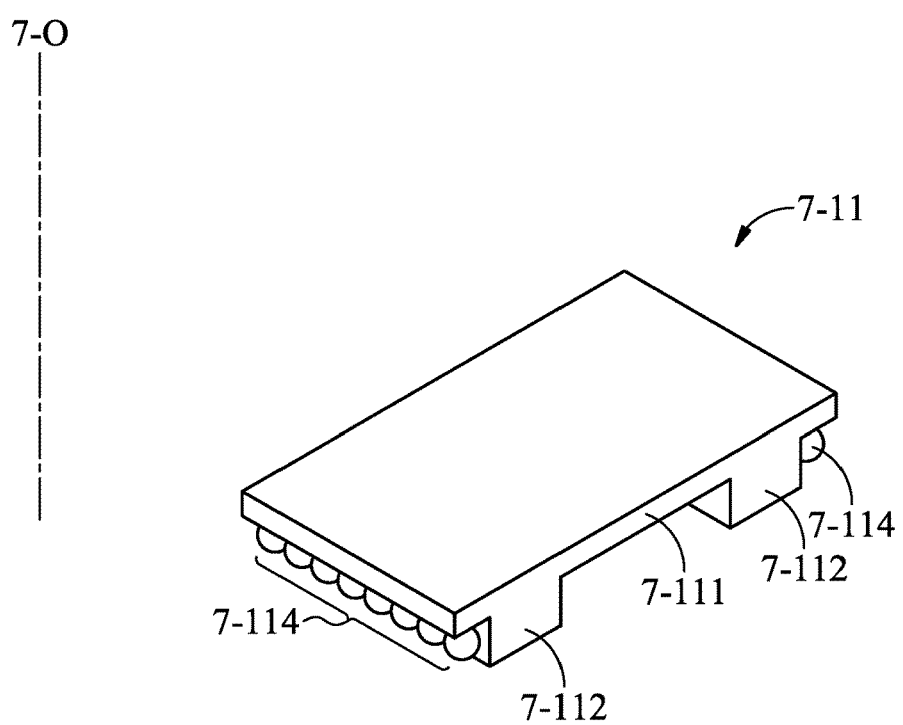
FIG. 5 shows a schematic view of the holder of the optical element driving mechanism according to another embodiment of the present disclosure.

As shown in FIG. 5, in some embodiments, the holder sliding part 7-114 may also be a plurality of balls 7-114. In the embodiment shown in FIG. 5, the balls 7-114 move (e.g. roll) between the holder body 7-111 and the outer frame sidewall 7-211 (may refer to FIG. 2), so that the holder 7-11 may move relative to the fixed part 7-20.

Figure 6:
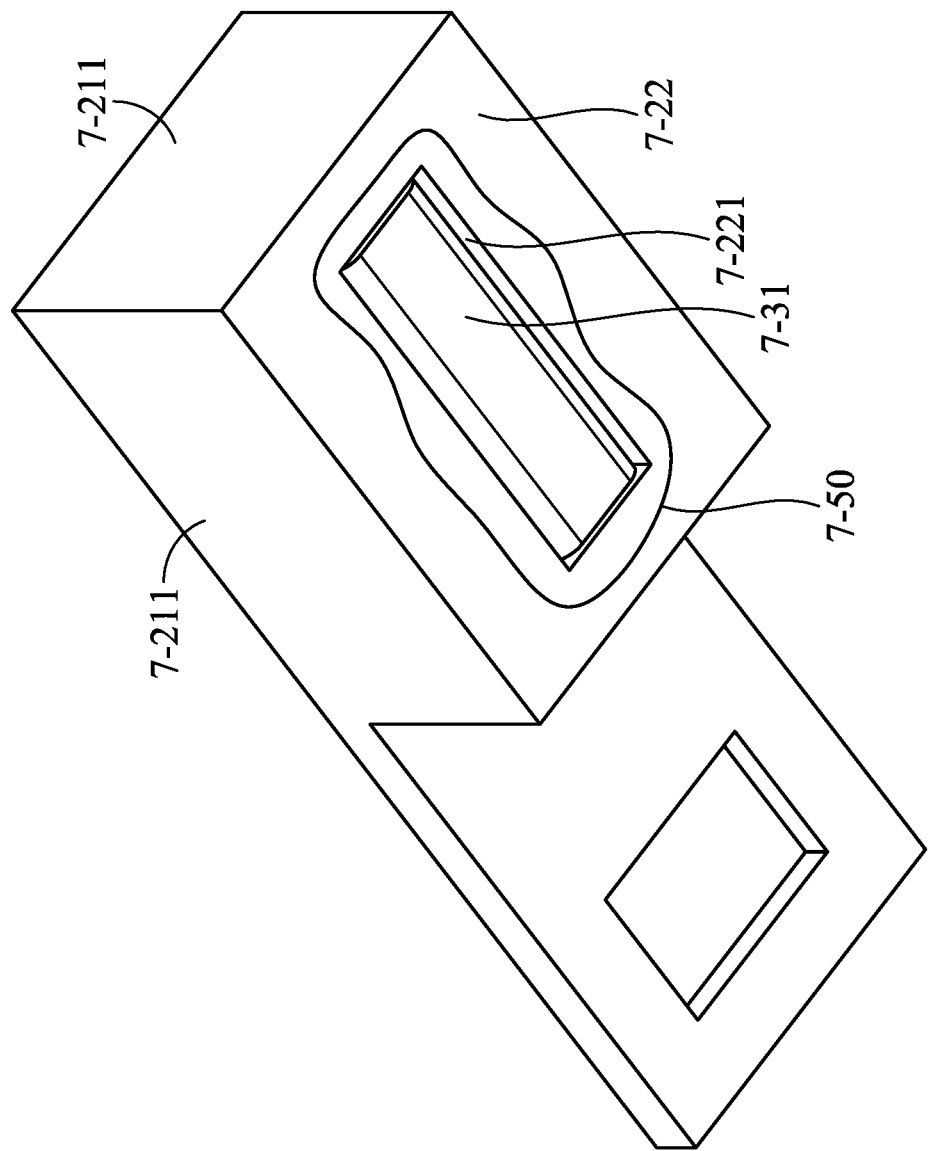
FIG. 6 shows a bottom view of the optical element driving mechanism according to an embodiment of the present disclosure.

Please refer to FIG. 6, the base plate 7-22 is located below the outer frame sidewalls 7-211, and is connected to the outer frame sidewalls 7-211. The base plate 7-22 has a base plate opening 7-221. The base plate opening 7-221 corresponds to the driving coil 7-31, which makes the driving coil 7-31 exposed to the base plate opening 7-221. The adhesive element 7-50 may be disposed on the portion of the driving coil 7-31 exposed to the base plate opening 7-221, so as to fix the driving coil 7-31 and prevent foreign matter such as dust and water from entering the optical element driving mechanism 7-100 through the base plate opening 7-221. It should be noted that the adhesive element 7-50 shown in FIG. 6 is for reference only, it does not indicate the actual shape the adhesive element 7-50.

Figure 7:
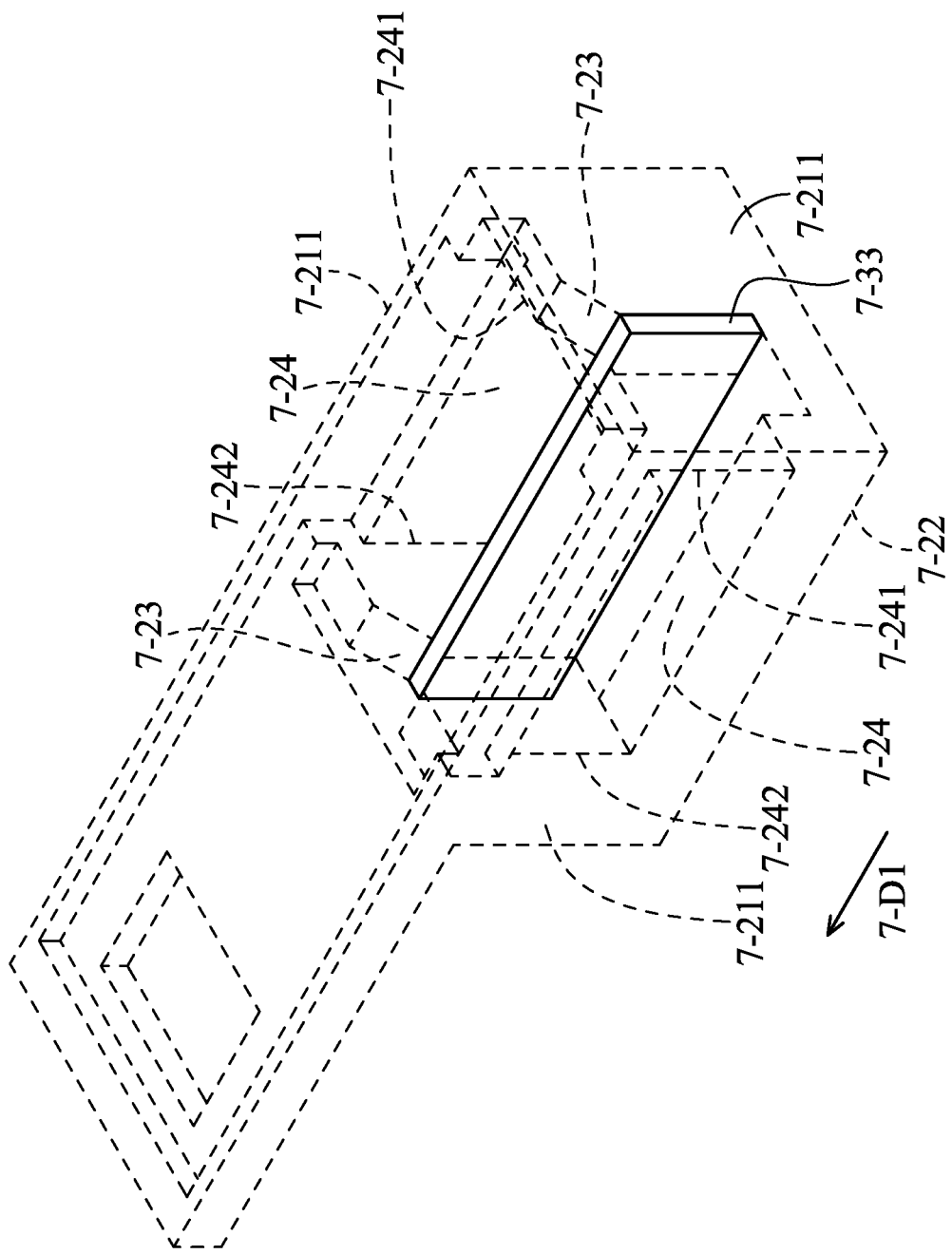
FIG. 7 shows a perspective view of the fixed part and a magnetic conductive element of the optical element driving mechanism according to an embodiment of the present disclosure, wherein the fixed part is shown as a dashed line.

Please refer to FIG. 7, the magnetic conductive element 7-33 is disposed in the magnetic conductive element accommodation 7-23. The magnetic conductive element accommodation 7-23 is disposed on the outer frame sidewall 7-211, and has an indented structure. That is, the width of the upper of the magnetic conductive element accommodation 7-23 is greater than the width of the lower of the magnetic conductive element accommodation 7-23, so as to be helpful to place the magnetic conductive element 7-33 into the magnetic conductive element accommodation 7-23. The magnetic element accommodation 7-24 is disposed on the outer frame sidewall 7-211 not provided with magnetic conductive element accommodation 7-23. The magnetic element accommodation 7-24 extends in the first direction 7-D1 and is adjacent to the base plate 7-22. The magnetic element accommodation 7-24 has a first side 7-241 and a second side 7-242 opposite each other.

Figure 8A:
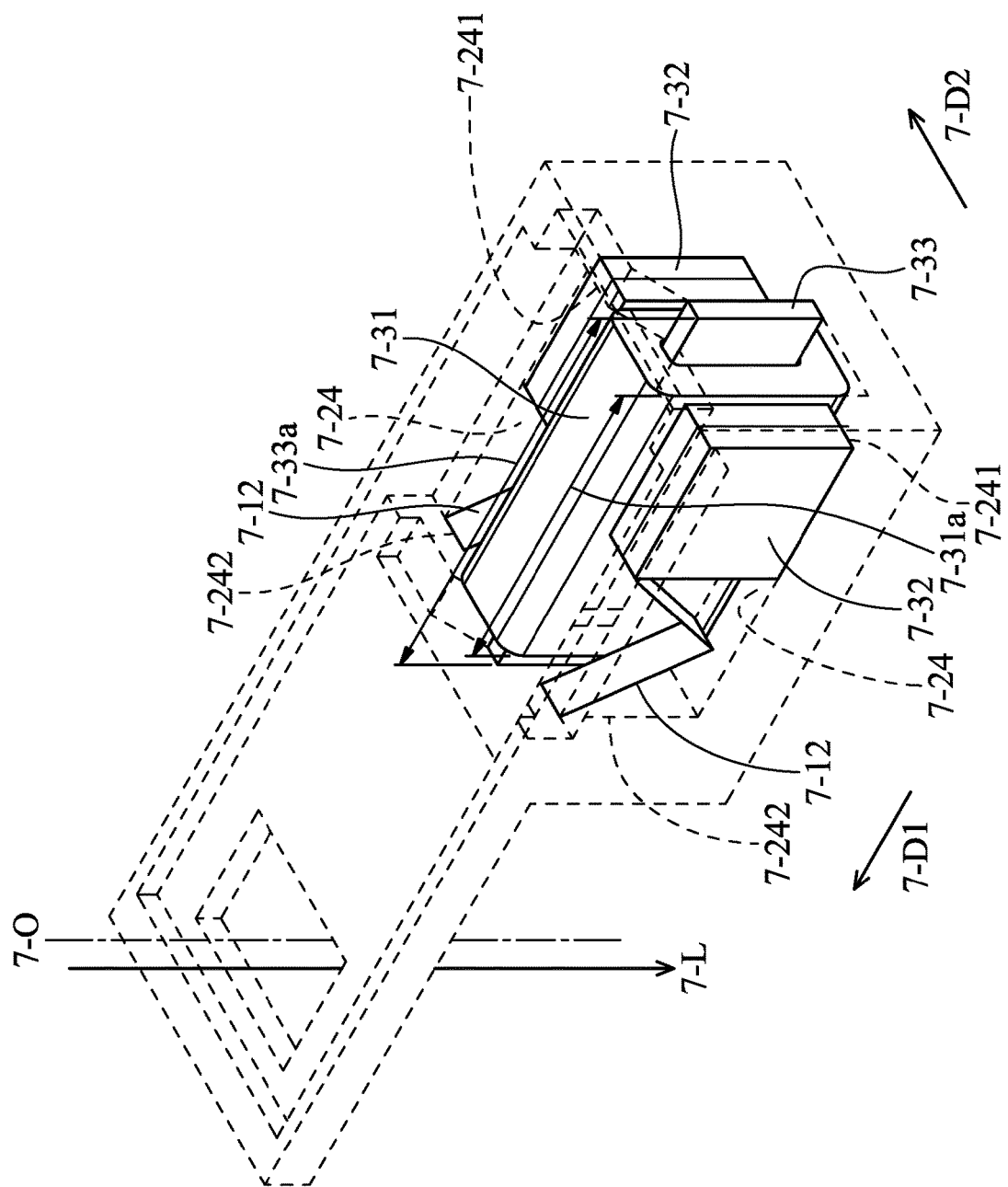
FIG. 8A shows a perspective view of the optical element driving mechanism according to an embodiment of the present disclosure, wherein the fixed part is shown as a dashed line and the holder is omitted.

Please refer to FIG. 8A, in the first direction 7-D1, the largest size 7-31a of the driving coil 7-31 is smaller than the largest size 7-33a of the magnetic conductive element 7-33. By doing so, loosing of the driving coil 7-31 and separating from the magnetic conductive element 7-33 are avoided. The magnetic elements 7-32 are accommodated in the magnetic element accommodation 7-24, and when the driving coil 7-31 does not receive an external current, the magnetic element 7-32 is located on the first side 7-241 (may be regarded as the starting position) of the magnetic element accommodation 7-24. Please refer to FIG. 2, when the magnetic element 7-32 is located on the first side 7-241, the driving assembly 7-30 does not drive the holder 7-11 and the first optical element 7-110, and the first optical element 7-110 does not overlap the outer frame extension opening 7-212a. That is, the first optical element 7-110 does not shield the outer frame extension opening 7-212a.

Figure 8B:
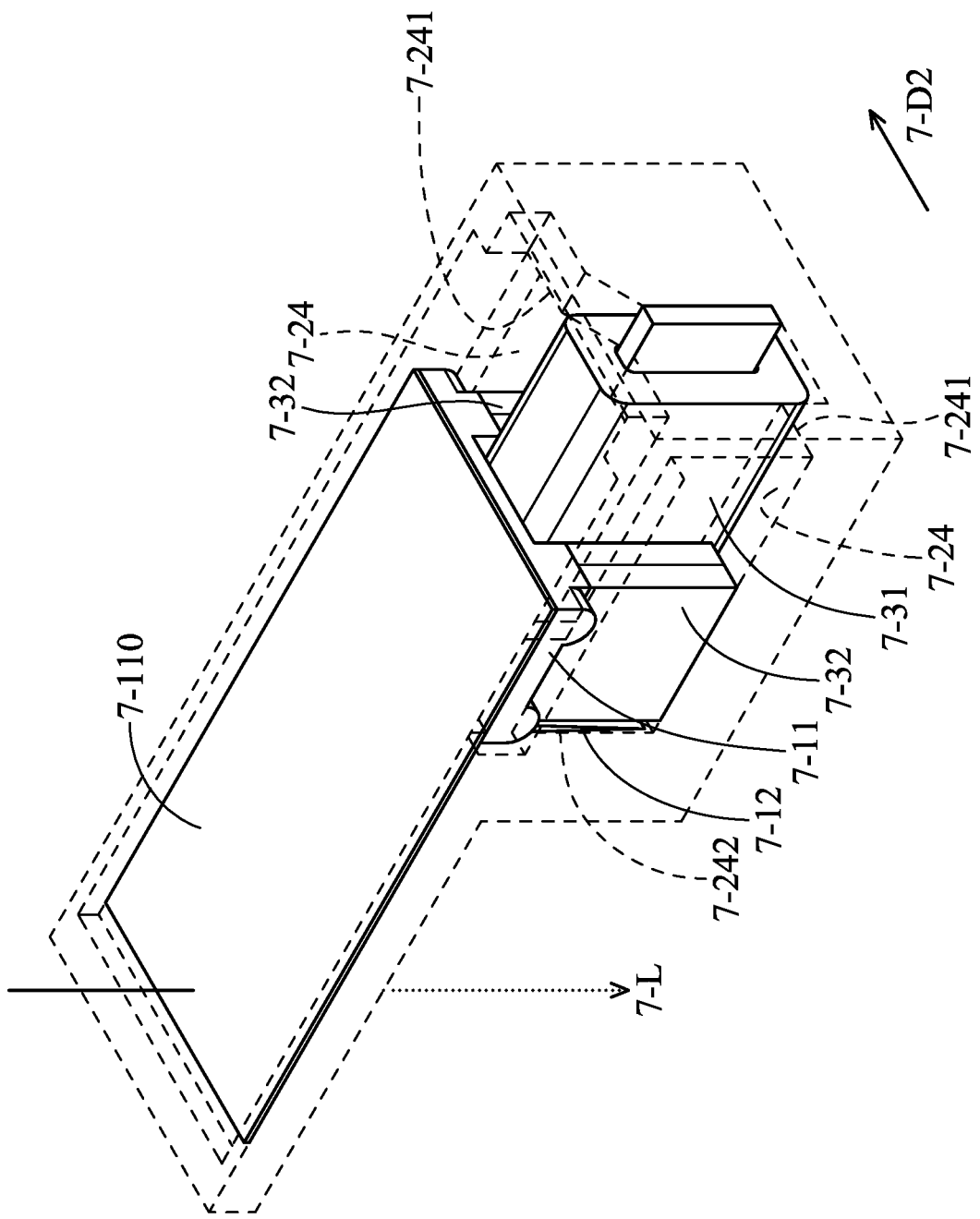
FIG. 8B shows a perspective view of the optical element driving mechanism and the first optical element according to an embodiment of the present disclosure, wherein the fixed part is shown as a dashed line.

When the driving coil 7-31 receives the external current, the magnetic element 7-32 is located on the second side 7-242 (may be regarded as the final position) of the magnetic element accommodation 7-24 (FIG. 8B). By doing so, the holder 7-11 and the first optical element 7-110 may be driven by the driving assembly 7-30, so that the first optical element 7-110 overlaps with the outer frame extension opening 7-212a (FIG. 8B). That is, the first optical element 7-110 shields the outer frame extension opening 7-212a. When the first optical element 7-110 is a shutter, a filter, a neutral density filter (ND filter), a polarizer, etc., the first optical element 7-110 may shield or reduce the light 7-L passing through the outer frame extension opening 7-212a.

As shown in FIG. 8A, the magnetic elements 7-32 are located on the left side and right side of the driving coil 7-31, respectively. That is, the magnetic elements 7-32 and the driving coil 7-31 are aligned in the second direction 7-D2. By doing so, the height of the optical element driving mechanism 7-100 in direction of the optical axis 7-O may be reduced. The magnetic conductive element 7-33 is connected to the fixed part 7-20, and is disposed in the magnetic conductive element accommodation 7-23 to prevent the magnetic conductive element 7-33 from moving relative to the fixed part 7-20.

In the embodiment shown in FIG. 8A, the elastic element 7-12 of the movable part 7-10 is disposed between the second side 7-242 of the magnetic element accommodation 7-24 and the magnetic element 7-32, and is connected to the second side 7-242 of the magnetic element accommodation 7-24 and the magnetic element 7-32. By doing so, when the driving coil 7-31 does not receive the external current, by the stretching force of the elastic element 7-12, the magnetic element 7-32 is disposed on the first side 7-241 of the magnetic element accommodation 7-24 more stably.

Figure 9A:
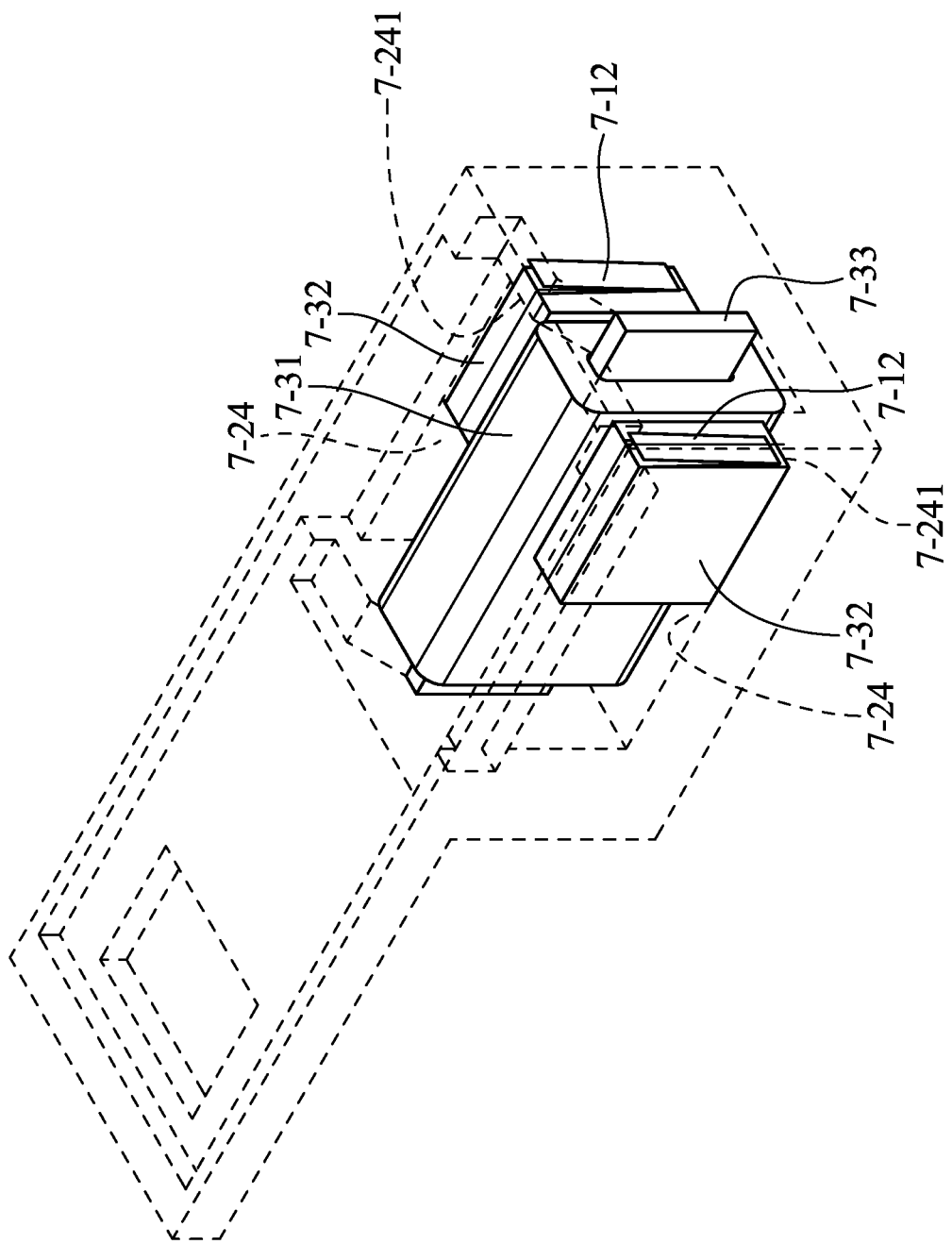
FIG. 9A shows a perspective view of the optical element driving mechanism according to another embodiment of the present disclosure, wherein the fixed part is shown as a dashed line and the holder is omitted.

Please refer to FIG. 9A, in the embodiment shown in FIG. 9A, the elastic element 7-12 of the movable part 7-10 is disposed between the first side 7-241 of the magnetic element accommodation 7-24 and the magnetic element 7-32, and is connected to the first side 7-241 of the magnetic element accommodation 7-24 and the magnetic element 7-32. By doing so, when the driving coil 7-31 does not receive the external current, by the contraction force of the elastic element 7-12, the magnetic element 7-32 is disposed on the first side 7-241 of the magnetic element accommodation 7-24 more stably.

Figure 9B:
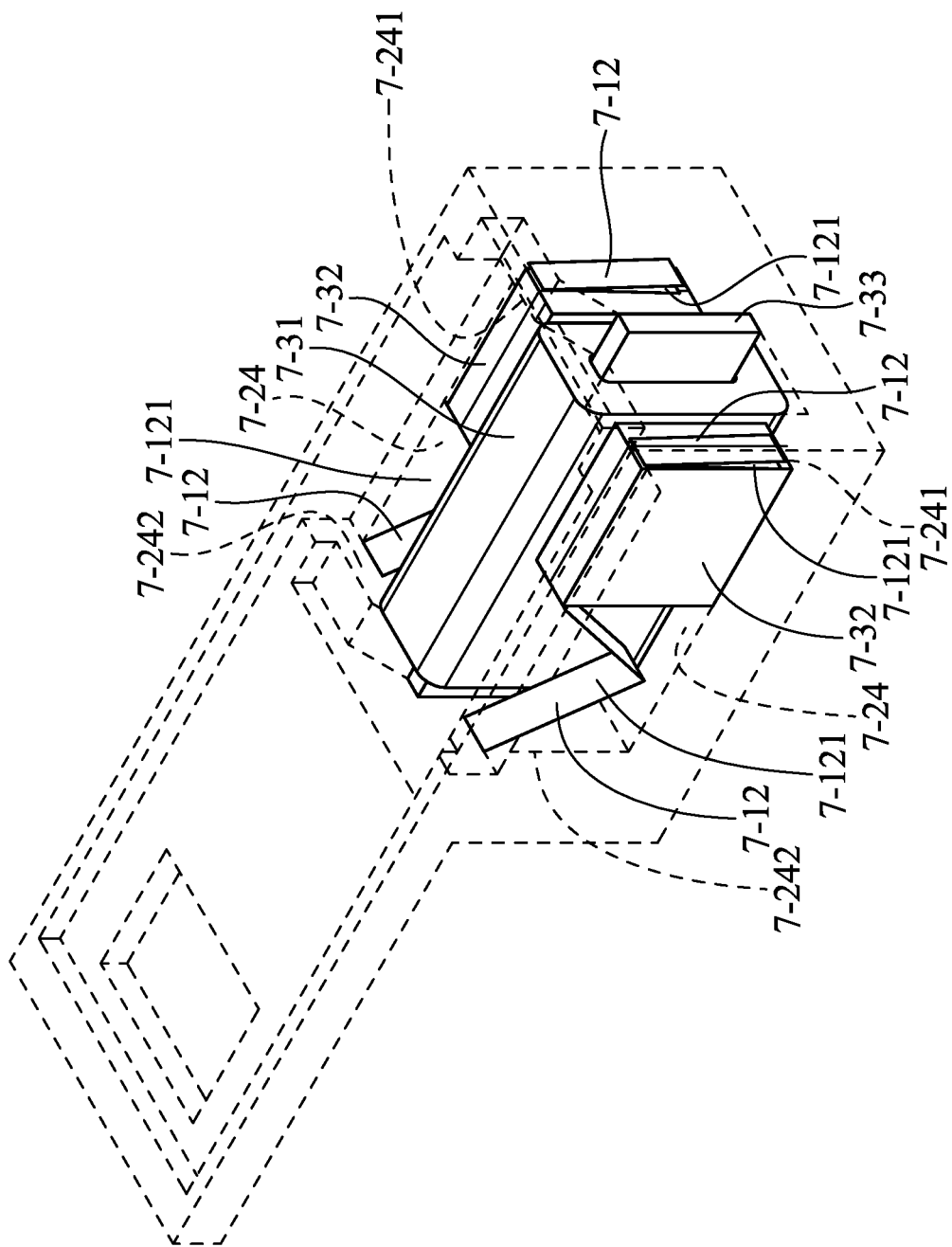
FIG. 9B shows a perspective view of the optical element driving mechanism according to another embodiment of the present disclosure, wherein the fixed part is shown as a dashed line and the holder is omitted.

Please refer to FIG. 9B, in the embodiment shown in FIG. 9B, the movable part 7-10 includes four elastic elements 7-12. The elastic elements 7-12 are disposed between the first side 7-241 of the magnetic element accommodation 7-24 and the magnetic element 7-32 and between the second side 7-242 of the magnetic element accommodation 7-24 and the magnetic element 7-32. The elastic elements 7-12 are connected to the first side 7-241 and the second side 7-242 of the magnetic element accommodation 7-24 and the magnetic element 7-32. By doing so, when the driving coil 7-31 does not receive the external current, by the stretching force and the contraction force of the elastic element 7-12, the magnetic element 7-32 is disposed on the first side 7-241 of the magnetic element accommodation 7-24 more stably. Moreover, the elastic elements 7-12 located in the same magnetic element accommodation 7-24 are upside down arranged. That is, when an opening 7-121 of the elastic element 7-12 located on the first side 7-241 faces up, the opening 7-121 of the elastic element 7-12 located on the second side 7-242 faces down (not shown); and when the opening 7-121 of the elastic element 7-12 located on the second side 7-242 faces up, the opening 7-121 of the elastic element 7-12 located on the first side 7-241 faces down (as shown in FIG. 9B). By doing so, the stretching force and the contraction force applied on the magnetic element 7-32 are more even, and thereby the magnetic element 7-32 is more stable.

Figure 10:
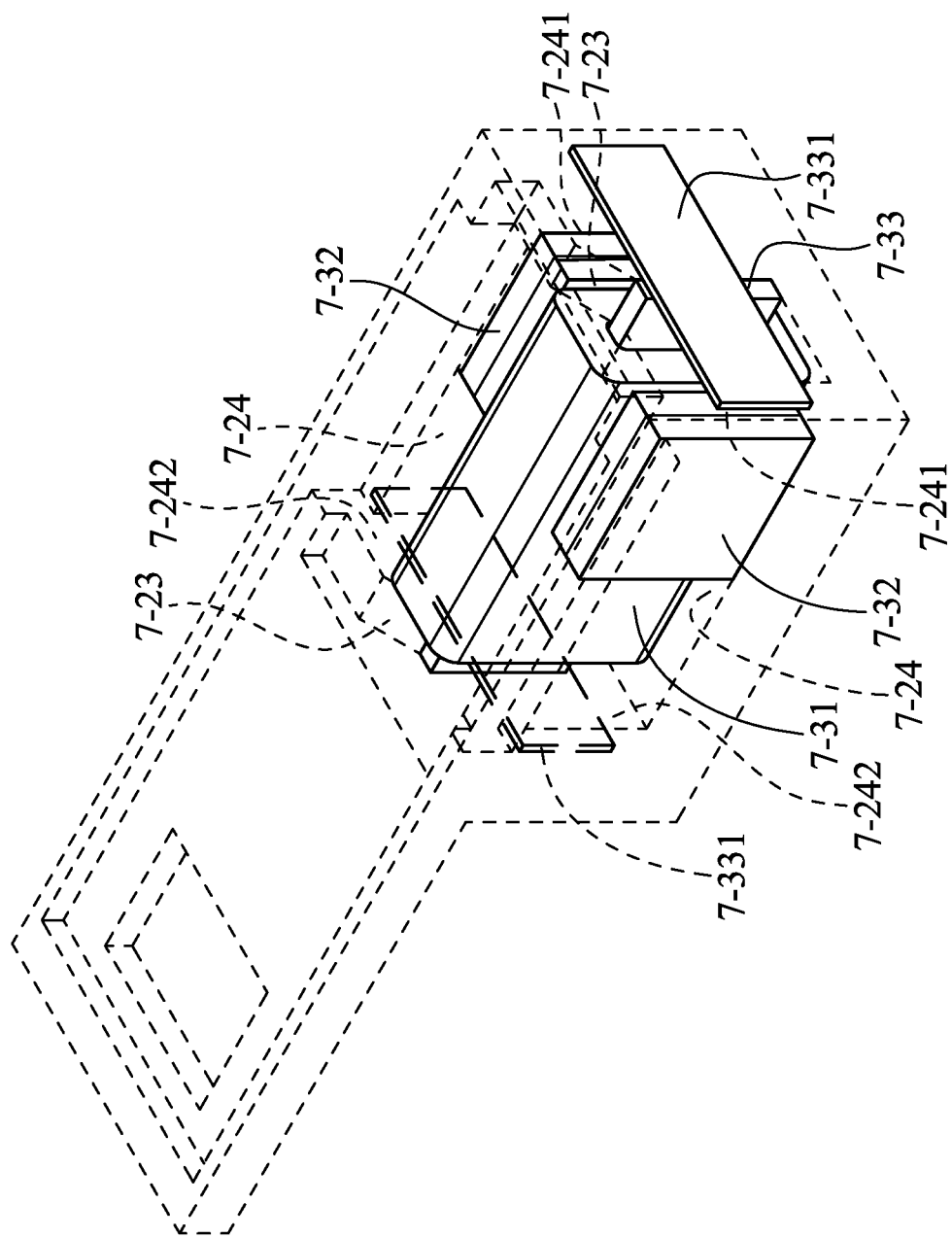
FIG. 10 shows a perspective view of the optical element driving mechanism according to another embodiment of the present disclosure, wherein the fixed part is shown as a dashed line and the holder is omitted.

Please refer to FIG. 10, a magnetic conductive element 7-331 may be disposed in the front of or behind the magnetic conductive element accommodation 7-23, so that the magnetic element 7-32 stays on the first side 7-241 or the second side 7-242 by the attractive force of the magnetic conductive element 7-33. In this way, when the driving coil 7-31 does not receive the external current, the holder 7-11 and the first optical element 7-110 (not shown in FIG. 10) may stay on the first side 7-241 (starting position) or the second side 7-242 (final position). It should be noted that although FIG. 10 shows two magnetic conductive elements 7-331, however, in practice, one, three, or more magnetic conductive elements 7-331 may be provided. In the embodiment shown in FIG. 10, the movable part 7-10 may no longer include the elastic element 7-12, and the magnetic element 7-32, holder 7-11 and the first optical element 7-110 stay at the desired position only by the attractive force between the magnetic element 7-32 and the magnetic conductive element 7-331.

Figure 11:
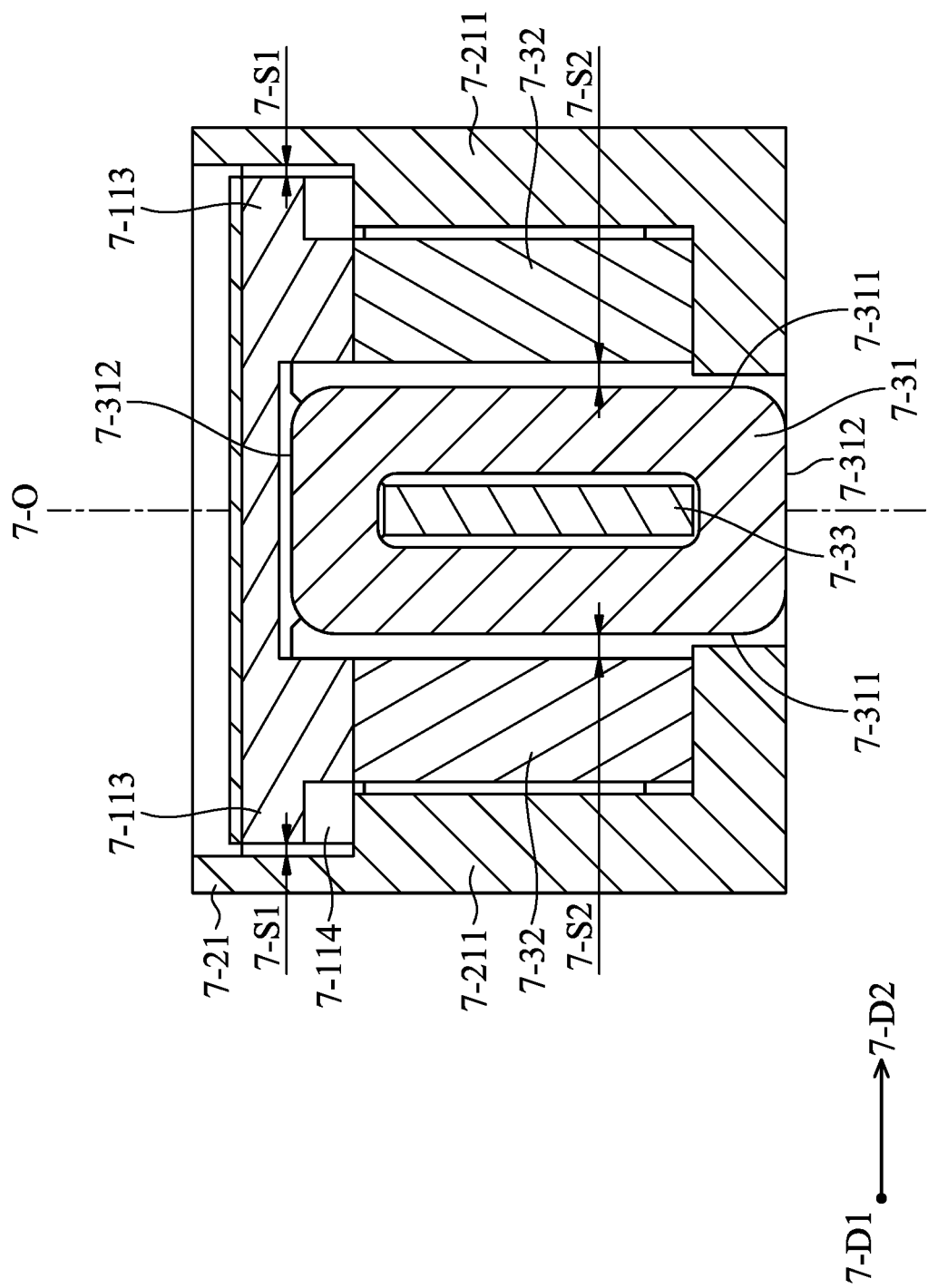
FIG. 11 shows a cross-sectional view of the optical element driving mechanism according to an embodiment of the present disclosure along a line 7-A-7-A in FIG. 2.

Please refer to FIG. 11, since the driving coil 7-31 surrounds (e.g. wounds) the magnetic conductive element 7-33 in the first direction 7-D1, therefore, the driving coil 7-31 has a polygonal structure when observed in the first direction 7-D1. Further, the driving coil 7-31 has two long sides 7-311 and two short sides 7-312. The long side 7-311 of the driving coil 7-31 is parallel to the optical axis 7-O, and the short side 7-312 of the driving coil 7-31 is parallel to the second direction 7-D2. The magnetic element 7-32 is disposed corresponding to the long side 7-311 of the driving coil 7-31. In this way, the electromagnetic force is effectively increased, so as to increase the driving force of the driving assembly 7-30 which drives the movable part 7-10. Moreover, the like magnetic poles of the magnetic elements 7-32 face the driving coil 7-31 (e.g. the north-seeking poles of the magnetic elements 7-32 face the driving coil 7-31, or the south-seeking poles of the magnetic elements 7-32 face the driving coil 7-31). By doing so, the magnetic elements 7-32 may move in the first direction 7-D1 at the same time when affected by the electromagnetic force. The minimum distance 7-S1 between the holder protrusion 7-113 of the holder 7-11 and the outer frame sidewall 7-211 of the outer frame 7-21 of the fixed part 7-20 is smaller than the minimum distance 7-S2 between the magnetic element 7-32 and the driving coil 7-31. In this way, the holder protrusion 7-113 contacts with the outer frame sidewall 7-211 first when the holder 7-11 is impacted and moves in the second direction 7-D2, and the magnetic element 7-32 is not in contact with the driving coil 7-31, thereby preventing the magnetic element 7-32 from colliding with the driving coil 7-31, and the damage is prevented.

Figure 12:
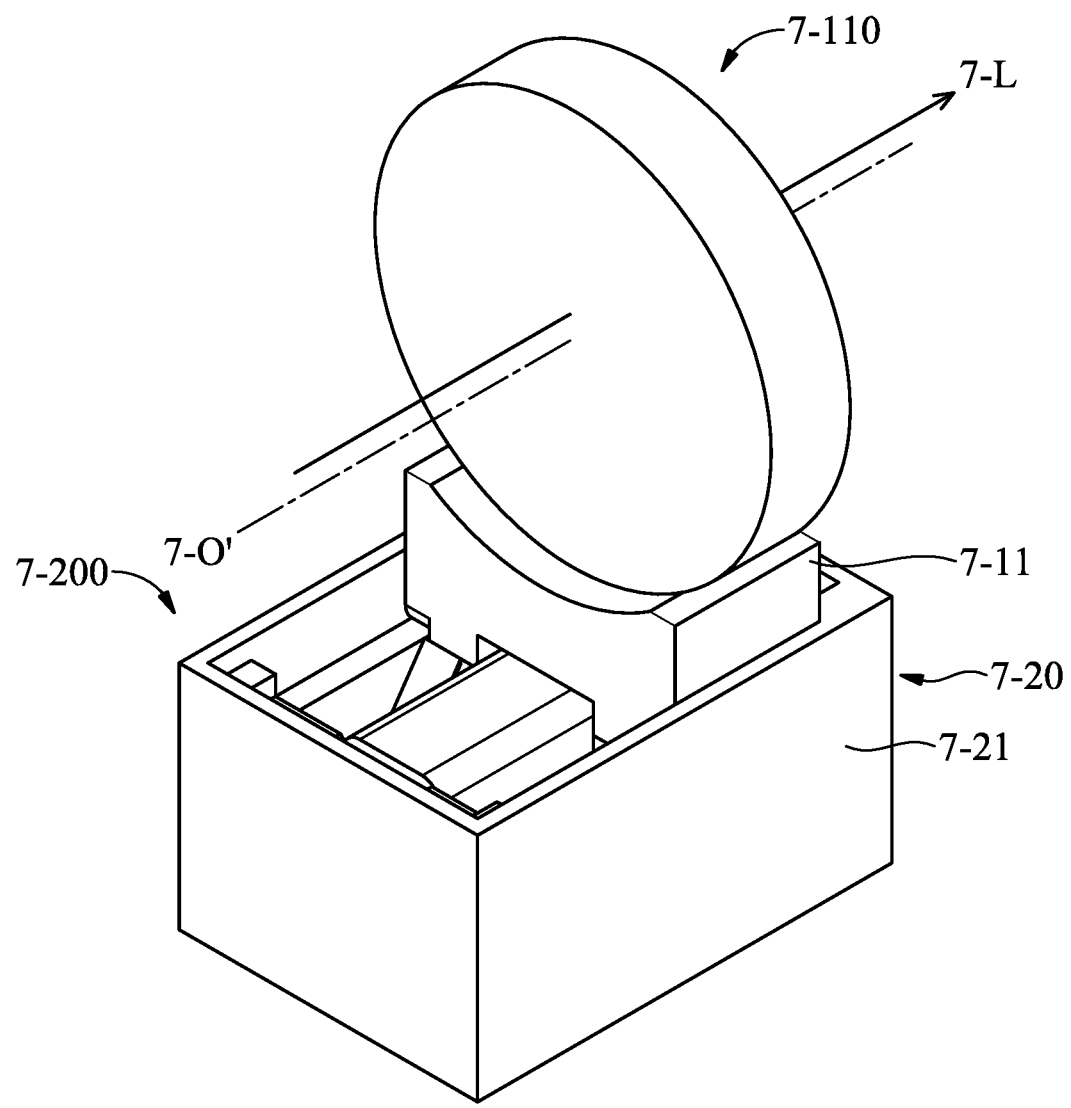
FIG. 12 shows a perspective view of the optical element driving mechanism and the first optical element according to another embodiment of the present disclosure.

Please refer to FIG. 12, FIG. 12 is a perspective view of an optical element driving mechanism 7-200 and the first optical element 7-110 of another embodiment of the present disclosure. The outer frame 7-21 of the fixed part 7-20 of the optical element driving mechanism 7-200 no longer includes an outer frame extension, and the first optical element 7-110 is a lens or the like. The main structure, function, and configuration of the optical element driving mechanism 7-200 same as that of the optical element driving mechanism 7-100 are not repeated herein. In the present embodiment, the optical axis 7-O' does not pass through the optical element driving mechanism 7-200, instead, the moving direction of the holder 7-11 the first optical element 7-110 is parallel to the optical axis 7-O'. With the movement of the first optical element 7-110, the path of the light 7-L is varied, thereby achieving zooming focusing.

Figure 13:
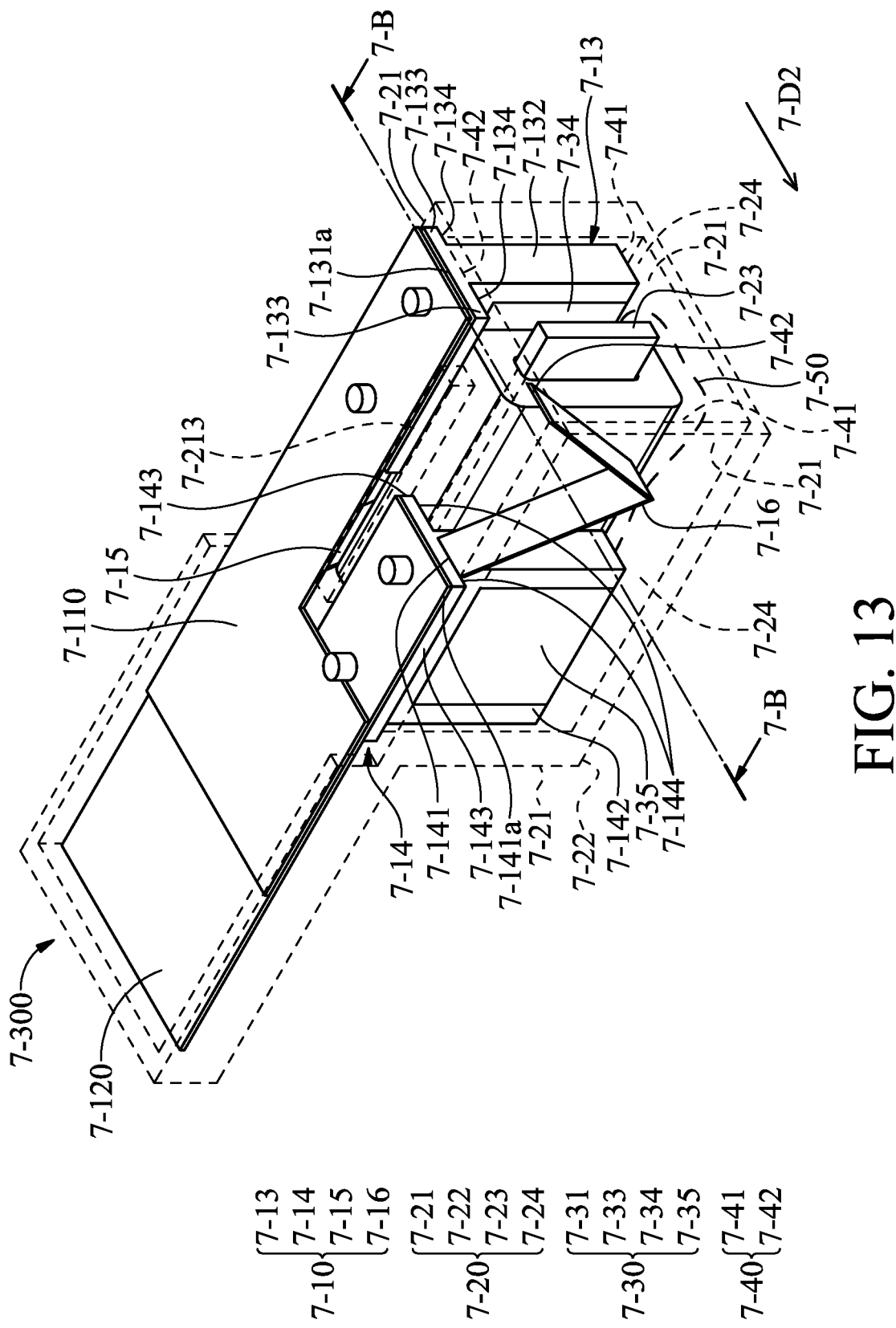
FIG. 13 shows a perspective view of the optical element driving mechanism, the first optical element and a second optical element according to another embodiment of the present disclosure.
Figure 14:
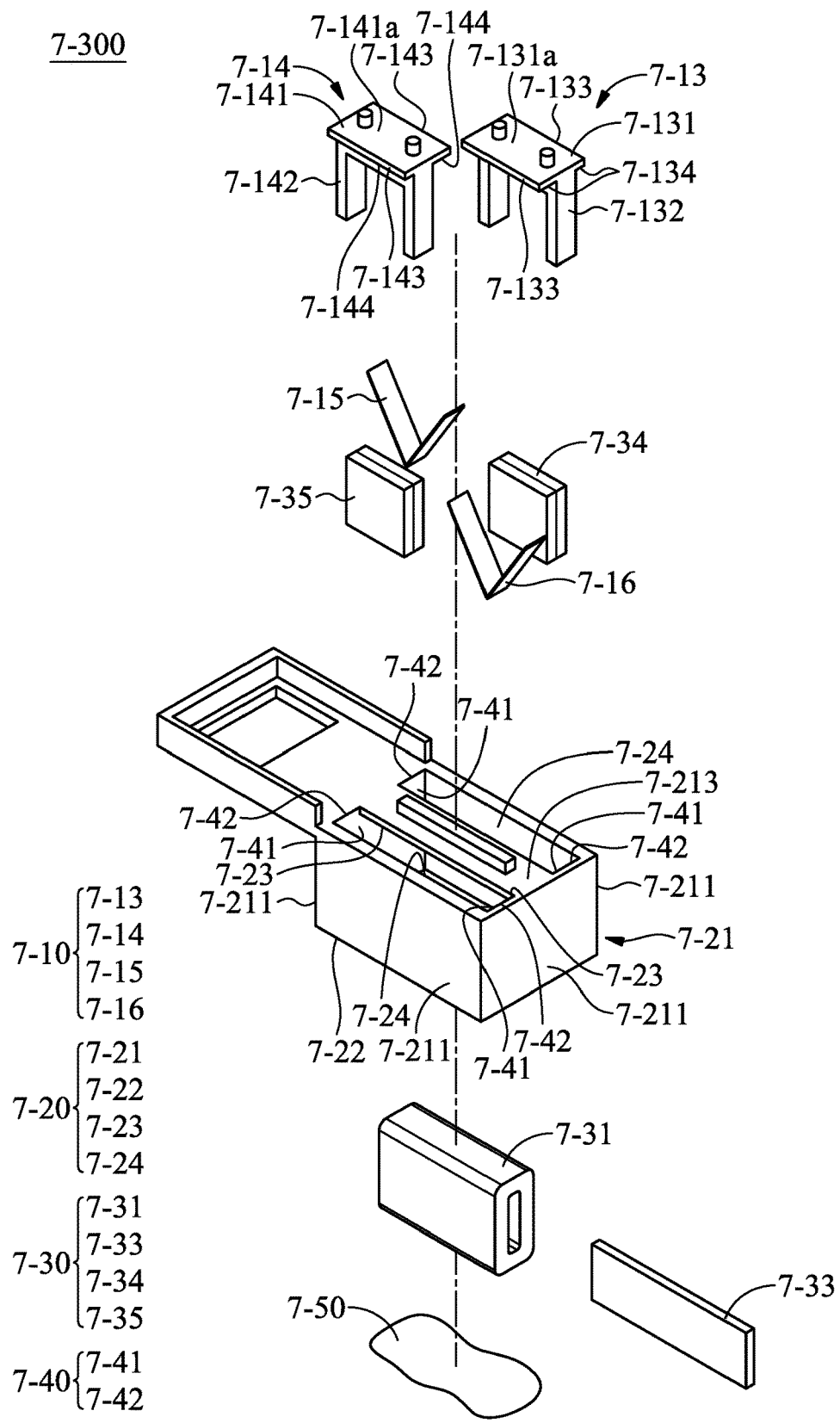
FIG. 14 shows an exploded view of the optical element driving mechanism according to another embodiment of the present disclosure.

Please refer to FIGS. 13 and 14, FIG. 13 is a perspective view of an optical element driving mechanism 7-300, the first optical element 7-110 and a second optical element 7-120 of another embodiment of the present disclosure, while FIG. 14 is an exploded view of the optical element driving mechanism 7-300. The main structure, function, and configuration of the optical element driving mechanism 7-300 same as that of the optical element driving mechanism 7-100 are not repeated herein.

As shown in FIGS. 13 and 14, the movable part 7-10 of the optical element driving mechanism 7-300 no longer includes a holder 7-11 or an elastic element 7-12. However, the movable part 7-10 includes a first movable unit 7-13, a second movable unit 7-14, a first elastic element 7-15, and a second elastic element 7-16. It should be noted that the configuration of the first elastic element 7-15 and the second elastic elements 7-16 is different from the configuration of the elastic elements 7-12. The outer frame 7-21 of the fixed part 7-20 of the optical element driving mechanism 7-300 includes an outer frame supporting wall 7-213. The driving assembly 7-30 of the optical element driving mechanism 7-300 no longer includes magnetic elements 7-32. However, the driving assembly 7-30 further includes a first magnetic element 7-34 and a second magnetic element 7-35. It should be noted that the configuration of the first magnetic element 7-34 and the second magnetic element 7-35 is different from that of the magnetic elements 7-32.

Please refer to FIG. 13 again, the structures of the first movable unit 7-13 and the second movable unit 7-14 are similar to the holder 7-11 of the optical element driving mechanism 7-100. The first movable unit 7-13 and the second movable unit 7-14 are movably disposed on the outer frame 7-21 of the fixed part 7-20, and are connected to the first optical element 7-110 and the second optical element 7-120, respectively. The first optical element 7-110 and the second optical element 7-120 may be a shutter, a filter, a neutral density filter (ND filter), a polarizer, or the like. Specifically, the first optical element 7-110 is disposed on the first movable unit 7-13, and the first optical element 7-110 may move as the first movable unit 7-13 moves relative to the fixed part 7-20; the second optical element 7-120 is disposed on the second movable unit 7-14, and the second optical element 7-120 may move as the second movable unit 7-14 moves relative to the fixed part 7-20.

The first movable unit 7-13 includes a first movable unit body 7-131, a first movable unit connecting part 7-132, two first movable unit protrusions 7-133, and a first movable unit sliding part 7-134. The first movable unit body 7-131 has a first movable unit body surface 7-131a. The first optical element 7-110 is disposed on the first movable unit body surface 7-131a, and is fixedly connected to the first movable unit body surface 7-131a. Therefore, the first movable unit body surface 7-131a may have a flat shape, or any shape that may be effectively connected to the first optical element 7-110. The first movable unit connecting part 7-132 is located on both sides of the first movable unit body 7-131, and the first movable unit connecting part 7-132 extends downwardly from the first movable unit body 7-131, and is connected to the first magnetic element 7-34.

The first movable unit protrusions 7-133 extend outwardly in the second direction 7-D2 from the both sides of the first movable unit body 7-131. The first movable unit sliding part 7-134 is located at the two sides of the first movable unit 7-13. The first movable unit sliding part 7-134 may be placed on the outer frame sidewalls 7-211 and the outer frame supporting wall 7-213 to move on the outer frame sidewalls 7-211 and the outer frame supporting wall 7-213. It should be noted that the first movable unit sliding part 7-134 may have a flat shape, a wheel shape, or any shape that is helpful to the movement of the first movable unit 7-13. In some embodiments, the first movable unit sliding part 7-134 may also be balls separated from the first movable unit body 7-131 (may refer to FIG. 5). The balls move (e.g. roll) between the first movable unit body 7-131 and the outer frame sidewall 7-211, so that the first movable unit 7-13 may move relative to the fixed part 7-20.

The second movable unit 7-14 includes a second movable unit body 7-141, a second movable unit connecting part 7-142, two second movable unit protrusions 7-143, and a second movable unit sliding part 7-144. The second movable unit body 7-141 has a second movable unit body surface 7-141a. The structure of the second movable unit 7-14 is similar to that of the first movable unit 7-13. That is, the second movable unit body 7-141, the second movable unit connecting part 7-142, the second movable unit protrusions 7-143, and the second movable unit sliding part 7-144 are similar to the first movable unit body 7-131, the first movable unit connecting part 7-132, the first movable unit protrusions 7-133, and the first movable unit sliding part 7-134, respectively. Therefore, the main structure, function, and configuration of the second movable unit 7-14 same as that of the first movable unit 7-13 are not repeated herein. However, it should be noted that the second movable unit connecting part 7-142 is connected to the second magnetic element 7-35 instead of the first magnetic element 7-34.

Figure 15:
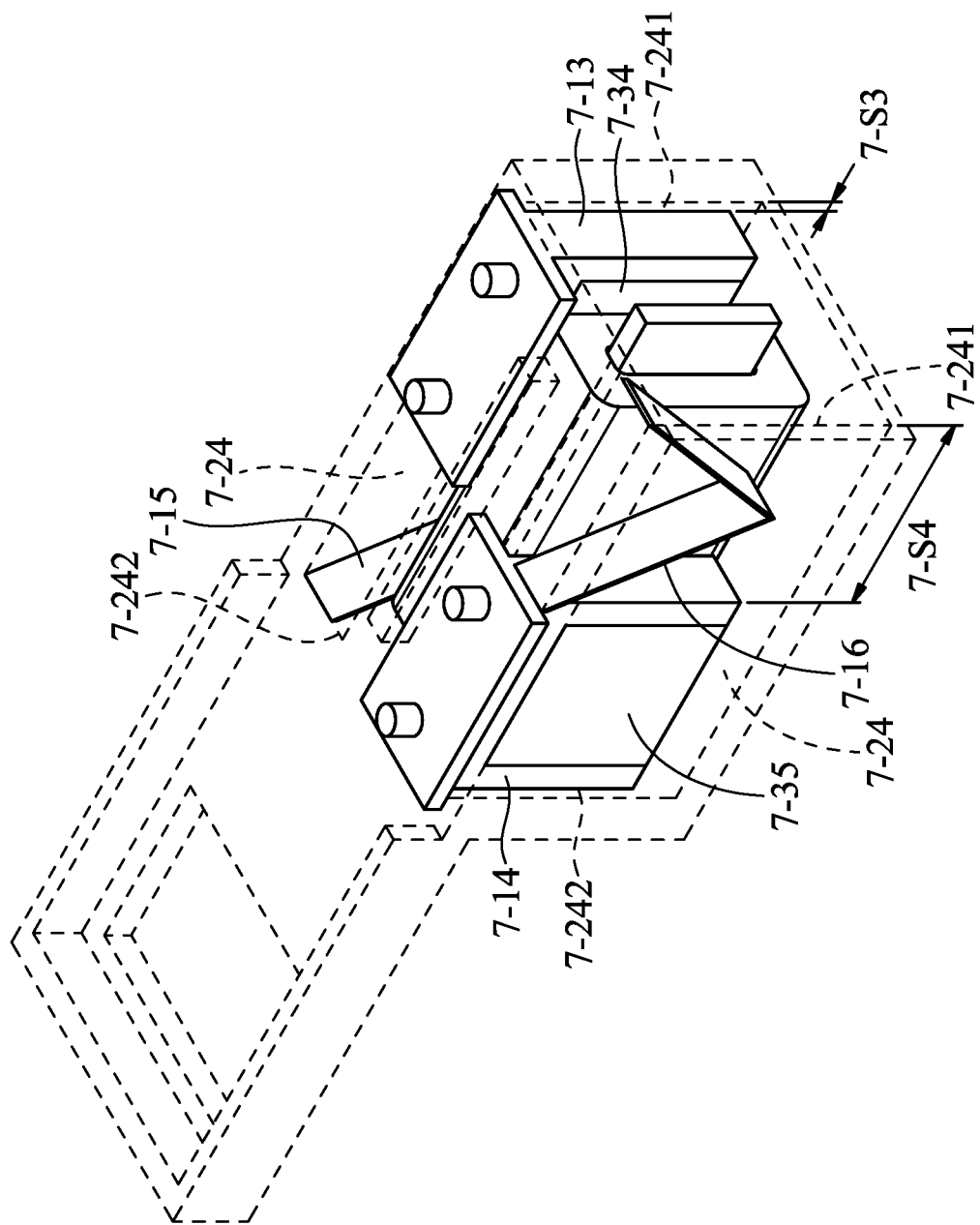
FIG. 15 shows a perspective view of the optical element driving mechanism according to another embodiment of the present disclosure, wherein the fixed part is shown as a dashed line.

Please refer to FIG. 15, the first elastic element 7-15 is disposed between the first movable unit 7-13 and the second side 7-242 of the magnetic element accommodation 7-24, and the first elastic element 7-15 is connected to the first movable unit 7-13 and the second side 7-242. The second elastic element 7-16 is disposed between the second movable unit 7-14 and the first side 7-241 of the magnetic element accommodation 7-24, and the second elastic element 7-16 is connected to the second movable unit 7-14 and the first side 7-241. The configuration of the first elastic element 7-15 and the second elastic element 7-16 may also refer to the configuration of the magnetic elements 7-32 of the optical element driving mechanism 7-100 in FIGS. 8A-9B. Of course, it is fine to refer to FIG. 10 as well, the magnetic conductive element 7-331 may be provided in front of or behind the magnetic conductive element accommodation 7-23 as well. However, it should be noted that when the driving coil 7-31 does not receive the external current, the first movable unit 7-13 and the first magnetic element 7-34 are adjacent to the first side 7-241, and the second movable unit 7-14 and the second magnetic element 7-35 are adjacent to the second side 7-242. That is, the shortest distance 7-S3 between the first magnetic element 7-34 and the first side 7-241 is smaller than the shortest distance 7-S4 between the second magnetic element 7-35 and the first side 7-241. However, in other embodiments, when the driving coil 7-31 does not receive the external current, the first movable unit 7-13 and the first magnetic element 7-34 are adjacent to the second side 7-242, and the second movable unit 7-14 and the second magnetic element 7-35 are adjacent to the first side 7-241. That is, the first movable unit 7-13, the first magnetic element 7-34, the second movable unit 7-14, and the second magnetic element 7-35 are not all located on the first side 7-241, nor all of them are located on the second side 7-242.

Figure 16:
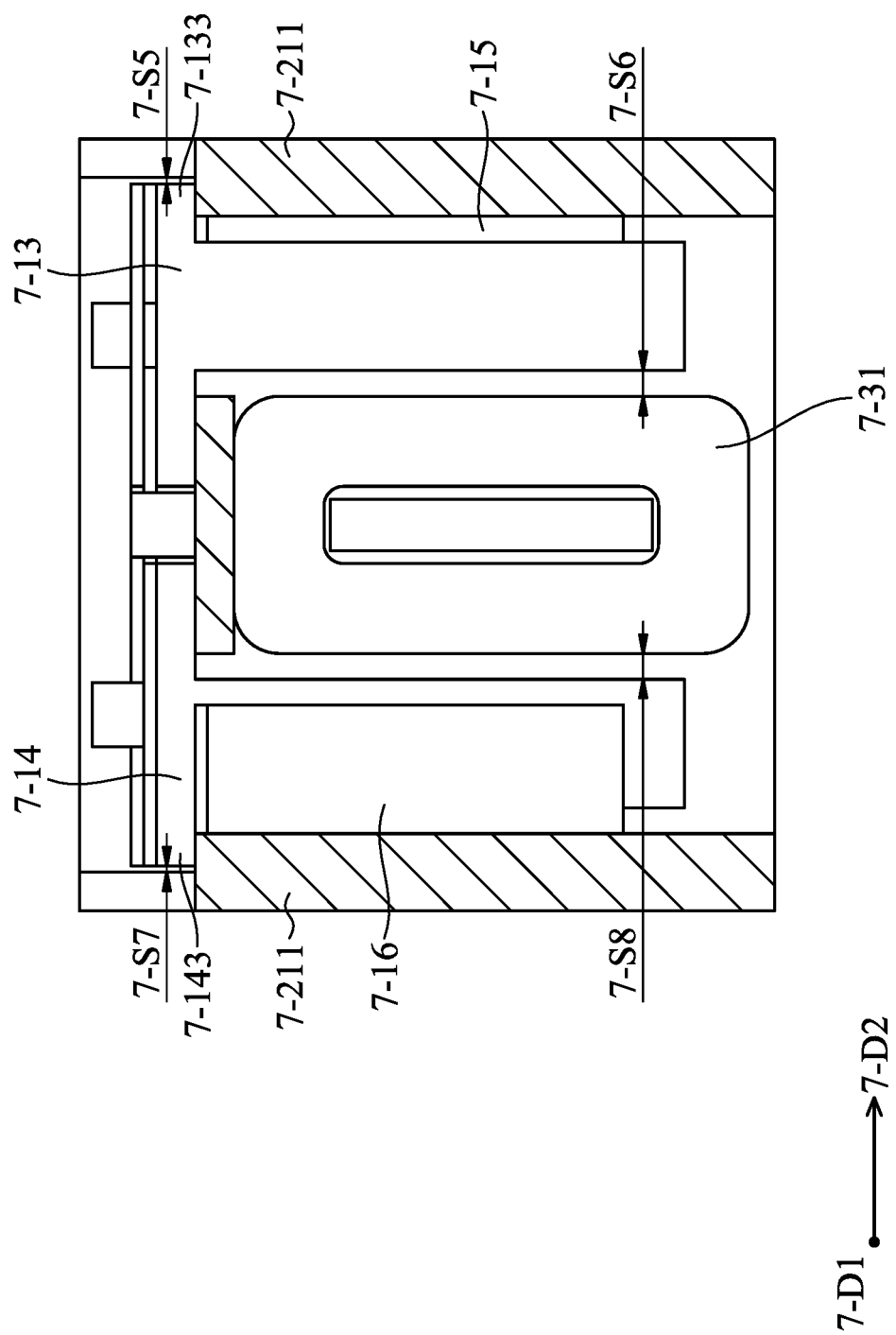
FIG. 16 shows a cross-sectional view of the optical element driving mechanism according to another embodiment of the present disclosure along a line 7-B-7-B in FIG. 13.

Please refer to FIG. 16, the opposite magnetic poles of the first magnetic element 7-34 and the second magnetic element 7-35 face the driving coil 7-31 (for example, the north-seeking pole of the first magnetic element 7-34 faces the driving coil 7-31, while the south-seeking pole of the second magnetic element 7-35 faces the driving coil 7-31; or, the south-seeking pole of the first magnetic element 7-34 faces the driving coil 7-31, while the north-seeking pole of the second magnetic element 7-35 faces the driving coil 7-31). By doing so, when affected by the electromagnetic force, one of the first magnetic element 7-34 and the second magnetic element 7-35 may move in the first direction 7-D1 while the other one of the first magnetic element 7-34 and the second magnetic elements 7-35 may move in a direction opposite the first direction 7-D1. Thus, the first movable unit 7-13 and the second movable unit 7-14 may be driven in the opposite direction, thereby the first optical element 7-110 and the second optical element 7-120 do not overlap the outer frame extension opening 7-212a at the same time. That is, the first movable unit 7-13 and the first optical element 7-110 may move relative to the second movable unit 7-14 and the second optical element 7-120, and the second movable unit 7-14 and the second optical element 7-120 may move relative to the first movable unit 7-13 and the first optical element 7-110 as well. In addition, the first optical element 7-110 and the second optical element 7-120 do not shield the outer frame extension opening 7-212a at the same time, so as to avoid the characteristic of the light 7-L from being affected by the first optical element 7-110 and the second optical element 7-120 at the same time.

As shown in FIG. 16, the minimum distance 7-S5 between the first movable unit protrusion 7-133 of the first movable unit 7-13 and the outer frame sidewall 7-211 and the outer frame supporting wall 7-213 of the outer frame 7-21 of the fixed part 7-20 is smaller than the minimum distance 7-S6 between the first magnetic element 7-34 and the driving coil 7-31. The minimum distance 7-S7 between the second movable unit protrusion 7-143 of the second movable unit 7-14 and the outer frame sidewall 7-211 and the outer frame supporting wall 7-213 of the outer frame 7-21 of the fixed part 7-20 is smaller than the minimum distance 7-S8 between the second magnetic element 7-35 and the driving coil 7-31. By doing so, when the first movable unit 7-13 and the second movable unit 7-14 are impacted and move in the second direction 7-D2, the first movable unit protrusion 7-133 and the second movable unit protrusion 7-143 contact with the outer frame sidewall 7-211 or the outer frame supporting wall 7-213 first, and the first magnetic element 7-34 and the second magnetic element 7-35 are not in contact with the driving coil 7-31, so as to prevent the first magnetic element 7-34 and the second magnetic element 7-352 from colliding with the driving coil 7-31 to avoid damage.

Figure 17:
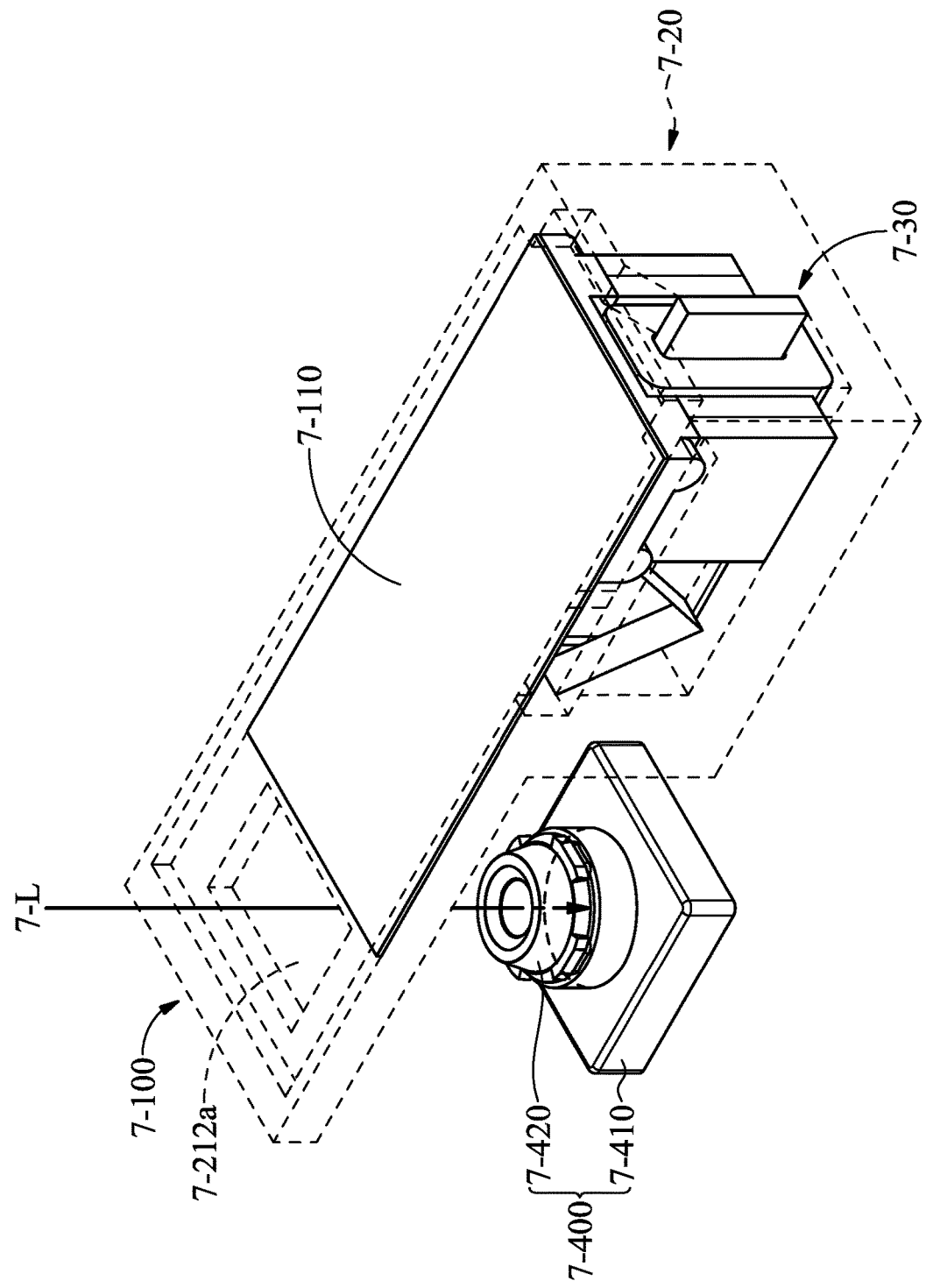
FIG. 17 shows a perspective view of an optical device according to an embodiment of the present disclosure, wherein the fixed part is shown as a dashed line.

Please refer to FIG. 17, FIG. 17 is a perspective view of an optical device 7-2 of an embodiment of the present disclosure. The optical device 7-2 may be mounted in the electronic apparatus 7-1 (may refer to FIG. 1). The optical device 7-2 includes any one or any combination of the aforementioned optical element driving mechanism 7-100, optical element driving mechanism 7-200, or optical element driving mechanism 7-300 (however, the embodiment shown in FIG. 17 is based on the optical element driving mechanism 7-100 only), and a camera module 7-400. The camera module 7-400 includes a photosensitive element 7-410 and an optical unit 7-420. The optical unit 7-420 is located between the optical element driving mechanism 7-100 and the photosensitive element 7-410. The optical unit 7-420 may be an optical element such as a lens, etc. After the light 7-L passes through the outer frame extension opening 7-212a and the optical unit 7-420 (the light 7-L may or may not pass through the first optical element 7-110 or the second optical element 7-120), the light 7-L may image on the photosensitive element 7-410 for taking photos or videos. The camera module 7-400 corresponds to the fixed part 7-20. Specifically, the space below the outer frame extension opening 7-212a of the fixed part 7-20 of the optical element driving mechanism 7-100 or the optical element driving mechanism 7-300 may accommodate the camera module 7-400. Further, the driving assembly 7-30 at least partially overlaps the photosensitive element 7-410 when observed in the first direction 7-D1. In this way, the space is used effectively, so that miniaturization of the optical element driving mechanism 7-100 and the optical element driving mechanism 7-300 is achieved.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
   a fixed part;
   a movable part, movably disposed on the fixed part, and connected to a first optical element, wherein the movable part comprises a holder, and the holder has a holder protrusion;
   a driving assembly, at least partially disposed on the fixed part, comprising:
      a driving coil, wound in a first direction, wherein the driving coil has a long side, and the driving coil has a polygonal structure when observed in the first direction; and
      a magnetic element, disposed corresponding to the long side; and
   a stopping assembly, disposed between the movable part and the fixed part,
   wherein the stopping assembly limits a range of a motion of the movable part relative to the fixed part,
   wherein a minimum distance between the holder protrusion and the fixed part is smaller than a minimum distance between the magnetic element and the driving coil.

2. The optical element driving mechanism as claimed in claim 1, wherein the driving assembly drives the movable part to move in the first direction.

3. The optical element driving mechanism as claimed in claim 1, wherein the driving assembly further comprises a magnetic conductive element connected to the fixed part, and a largest size of the driving coil is smaller than the largest size of the magnetic conductive element when observed in the first direction.

4. The optical element driving mechanism as claimed in claim 1, wherein the driving assembly further comprises a plurality of magnetic elements, and like magnetic poles of the magnetic elements face the driving coil.

5. The optical element driving mechanism as claimed in claim 4, wherein the fixed part comprises a magnetic element accommodation and a base plate, the magnetic element accommodation accommodates the magnetic elements, and the magnetic element accommodation extends in the first direction, and the base plate is adjacent to the magnetic element accommodation.

6. The optical element driving mechanism as claimed in claim 5, wherein the base plate comprises a base plate opening corresponding to the driving coil.

7. The optical element driving mechanism as claimed in claim 5, wherein the magnetic element accommodation has a first side, and when the driving coil does not receive an external current, the magnetic element is located on the first side.

8. The optical element driving mechanism as claimed in claim 7, wherein the movable part comprises an elastic element, and the magnetic element accommodation further comprises a second side opposite to the first side, the elastic element is connected to the magnetic element and the first side or the second side.

9. The optical element driving mechanism as claimed in claim 1, further comprising an optical axis, wherein the long side of the driving coil is parallel to the optical axis.

10. The optical element driving mechanism as claimed in claim 1, wherein the fixed part has an outer frame sidewall facing the driving coil, and the fixed part further comprises a magnetic conductive element accommodation disposed on the outer frame sidewall.

11. The optical element driving mechanism as claimed in claim 10, wherein the magnetic conductive element accommodation has an indented structure.

12. The optical element driving mechanism as claimed in claim 1, further comprising a first magnetic element and a second magnetic element, and the opposite magnetic poles of the first magnetic element and the second magnetic element face the driving coil.

13. The optical element driving mechanism as claimed in claim 12, wherein the fixed part comprises a magnetic element accommodation, the magnetic element accommodation has a first side and a second side opposite to each other, when the driving coil does not receive an external current, the first magnetic element is adjacent to the first side, and the second magnetic element is adjacent to the second side, and a shortest distance between the first magnetic element and the first side is smaller than a shortest distance between the second magnetic element and the first side.

14. The optical element driving mechanism as claimed in claim 13, wherein the movable part comprises:
a first movable unit;
a second movable unit;
a first elastic element, disposed between the first movable unit and the second side; and
a second elastic element, disposed between the second movable unit and the first side.

15. The optical element driving mechanism as claimed in claim 14, wherein the first movable unit is connected to the first optical element, the second movable unit is connected to a second optical element, and the first movable unit is movable relative to the second movable unit.

16. An optical device, comprising:
the optical element driving mechanism as claimed in claim 1; and
a camera module, comprising:
a photosensitive element; and
an optical unit, located between the optical element driving mechanism and the photosensitive element,
wherein the fixed part corresponds to the camera module.

17. The optical device as claimed in claim 16, wherein the driving assembly at least partially overlaps the photosensitive element when observed in the first direction.

18. An optical element driving mechanism, comprising:
a fixed part, comprising:
a magnetic element accommodation, having a first side and a second side opposite to each other;
a movable part, movably disposed on the fixed part, and connected to a first optical element;
a driving assembly, at least partially disposed on the fixed part, comprising:
a first magnetic element;
a second magnetic element; and
a driving coil, wound in a first direction, wherein the driving coil has a polygonal structure when observed in the first direction; and
a stopping assembly, disposed between the movable part and the fixed part,
wherein the stopping assembly limits a range of a motion of the movable part relative to the fixed part,
wherein the opposite magnetic poles of the first magnetic element and the second magnetic element face the driving coil,
wherein when the driving coil does not receive an external current, the first magnetic element is adjacent to the first side, and the second magnetic element is adjacent to the second side,
wherein the shortest distance between the first magnetic element and the first side is smaller than the shortest distance between the second magnetic element and the first side.

* * * * *